United States Patent [19]

Estrugo

[11] 3,958,909

[45] May 25, 1976

[54] CANDLE MAKING MACHINE

[76] Inventor: Nereo A. Estrugo, 105 Medford St., Arlington, Mass. 02174

[22] Filed: Apr. 7, 1975

[21] Appl. No.: 565,804

[52] U.S. Cl. .......... 425/112; 425/126 R; 425/803

[51] Int. Cl.$^2$ .......... B29D 31/00

[58] Field of Search .......... 425/DIG. 108, 803, 110, 425/112, 125, 126 R, 126 S

[56] References Cited

UNITED STATES PATENTS

| | | | |
|---|---|---|---|
| 1,390,257 | 9/1921 | Dillman | 425/803 |
| 1,786,634 | 12/1930 | Sgritta | 425/803 |
| 3,759,478 | 9/1973 | Schmitt et al. | 425/803 |

FOREIGN PATENTS OR APPLICATIONS

| | | | |
|---|---|---|---|
| 1,930,568 | 6/1969 | Germany | 425/803 |

*Primary Examiner*—Francis S. Husar
*Assistant Examiner*—Carl Rowold
*Attorney, Agent, or Firm*—Kane, Dalsimer, Kane, Sullivan and Kurucz

[57] ABSTRACT

A machine is provided for producing decorative candles of the type having a main body portion and an insert extending for substantially the entire length of the candle. The machine includes a first conveyor and a second conveyor with a horizontal section of the second conveyor path extending parallel to and spaced vertically above a horizontal section of the first conveyor path. At least one candle insert mold base is carried by the first conveyor and at least one candle insert mold is carried by the second conveyor with the conveyors being so aligned that the insert mold is deposited on the base at the upstream end of a portion of the machine and removed from the base at the downstream end of the machine portion. A first casting station is provided along the machine portion to cast the candle insert. Means are provided along the machine portion for forming a bore extending through the insert with a countersink at one end. The second conveyor carries the mold and insert to a removal station wherein the insert is removed from the mold and deposited onto a third conveyor. The third conveyor carries the insert to a means for inserting a wick through the insert; depositing a main body mold about the insert; passing a second casting station for casting the main body of the candle about the insert; and a removal station for removing the completed candle.

8 Claims, 12 Drawing Figures

FIG. 2
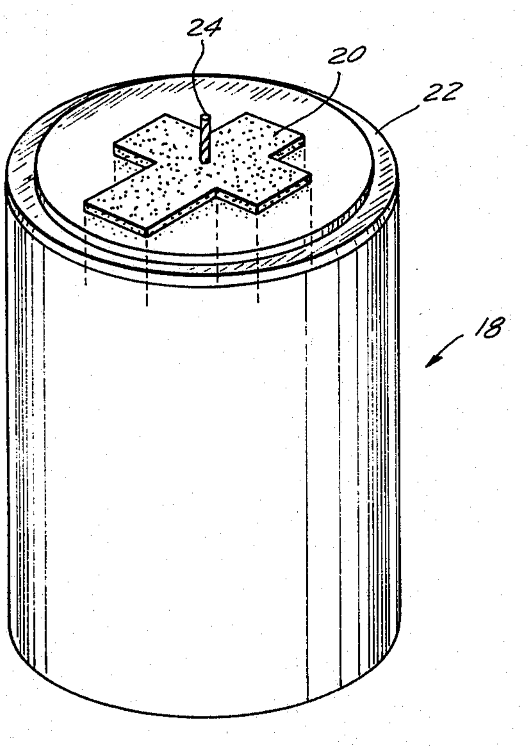
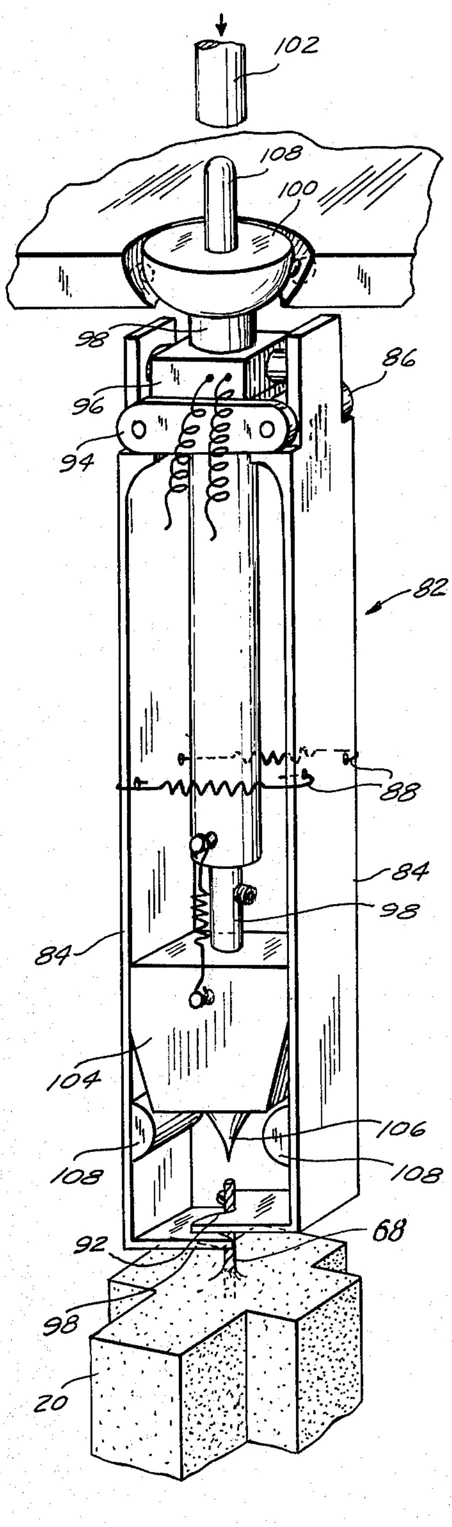
FIG. 4
FIG. 5
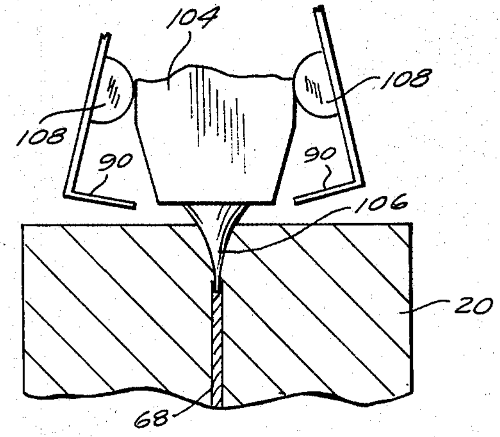

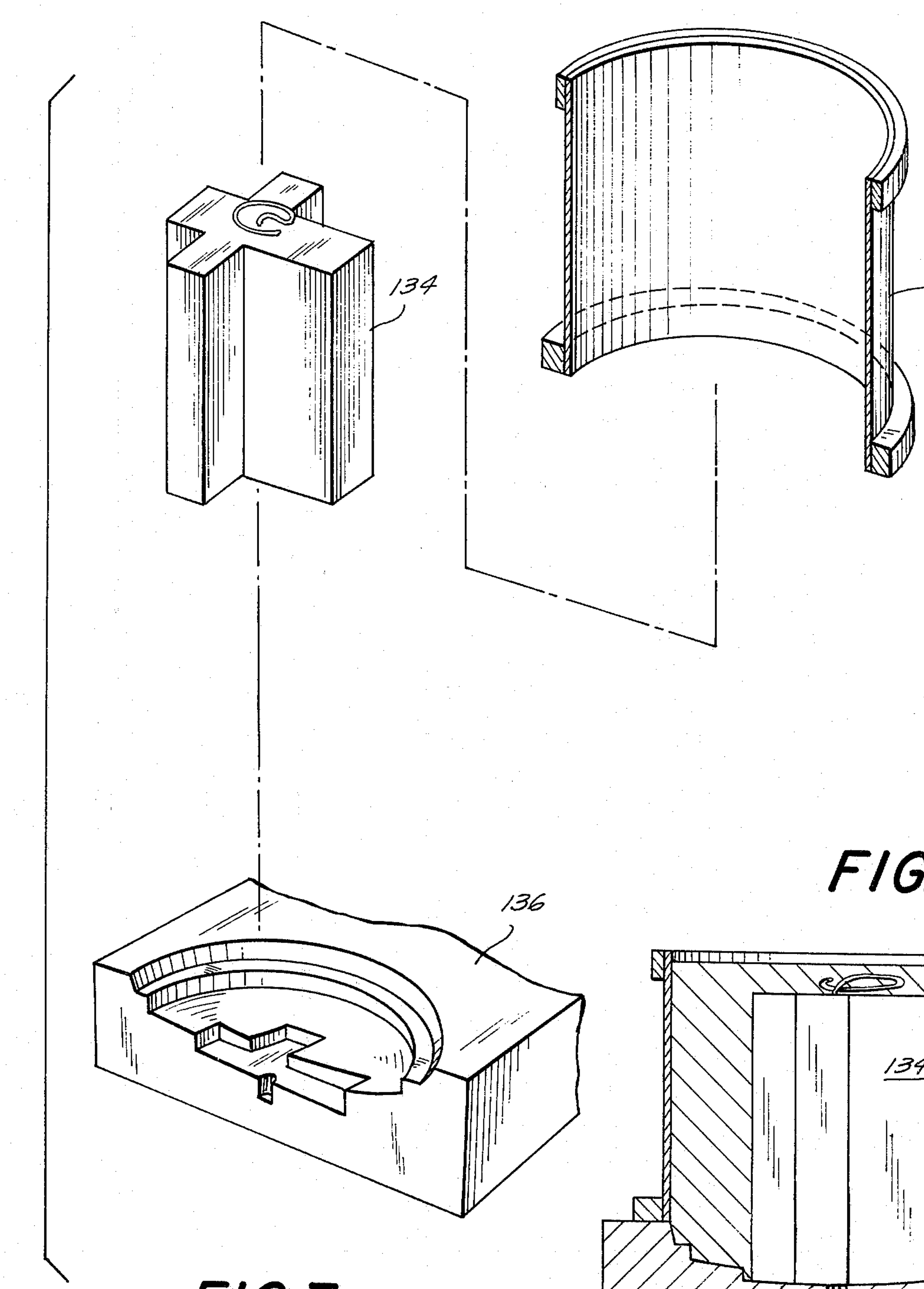
FIG.7
FIG.8
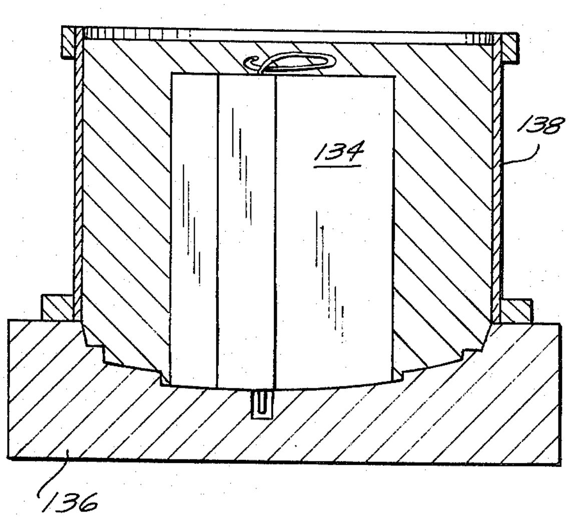

CANDLE MAKING MACHINE

BACKGROUND OF THE INVENTION

The present invention relates to an automatic machine for the production of candles and more particularly to a machine for the production of decorative candles of the type having an insert within a main body portion.

Candles are commonly used on many festive and religious occasions and indeed form part of many religious rituals. It is well known that candles are commonly formed of wax or paraffin which, because of its soft, easily workable nature, can readily be hand formed or molded into virtually any shape. As a result, decorative candles are quite common. However, heretofore, such decorative candles have been relatively expensive due to the requirement that the candles be at least partially handmade. This is particularly so with regard to candles of the type comprising an insert surrounded by a main body portion. As the candle burns, the insert burns uniformly with the main body portion so that the shape of the insert is maintained throughout the life of the candle.

In view of the above, the principal object of the present invention is to provide an improved machine for the automated production of decorative candles of the type described.

SUMMARY OF THE INVENTION

The above are the beneficial objects and advantages attained by providing a machine for the production of candles of the type having a main body portion and an insert extending for substantially the entire length of the candle. The machine includes a first conveyor and a second conveyor with a horizontal section of the second conveyor path extending parallel to and spaced vertically above a horizontal section of the first conveyor path. At least one candle insert mold base is carried by the first conveyor and at least one candle insert mold is carried by the second conveyor with the conveyors being so aligned that the insert mold is deposited on the base at the upstream end of a portion of the machine and removed from the base at the downstream end of the machine portion. A first casting station is provided along the machine portion to cast the candle insert. Means are provided along the machine portion for forming a bore extending through the insert with a countersink at one end. The second conveyor carries the mold and insert to a removal station wherein the insert is removed from the mold and deposited onto a third conveyor. The third conveyor carries the insert to a means for inserting a wick through the insert; depositing a main body mold about the insert; passing a second casting station for casting the main body of the candle about the insert; and a removal station for removing the completed candle.

BRIEF DESCRIPTION OF THE DRAWINGS

In the accompanying drawings:

FIG. 2 is a perspective view of a decorative candle typical of the type that can be produced utilizing the machine of the present invention;

FIG. 4 is a perspective view of the candle insert countersink forming means of the present machine;

FIG. 5 is a fragmentary sectional view of the countersink means of FIG. 4 in operative position;

FIG. 7 is an exploded perspective view of the means for casting the main body portion of the candle about the insert; and, FIG. 8 is a side elevational sectional view of the main body portion casting means.

DETAILED DESCRIPTION OF THE PREFERRED EMBODIMENT

Figures 1A, 1B:
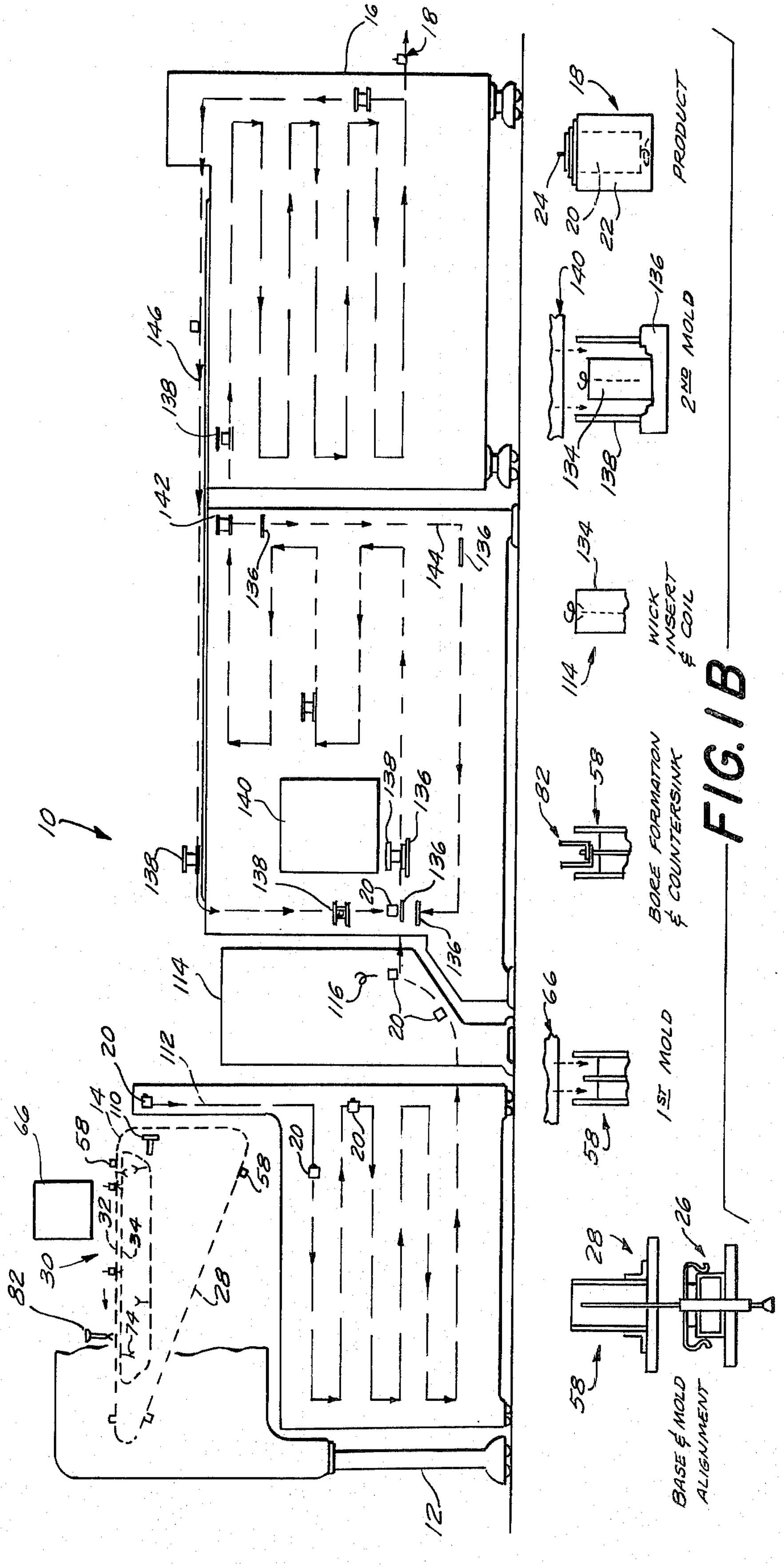
FIG. 1A is a schematic representation of the machine produced in accordance with the present invention.
FIG. 1B comprises a series of assembly drawings depicting various pertinent sections of the machine.

In FIG. 1, the machine 10 of the present invention is illustrated in schematic form. The machine comprises a framework 12 carrying the various sections of the machine. The machine 10 includes an upstream end 14 wherein the initial formation of the candle is begun and a downstream end 16 from which the completed candle 18 is removed.

A typical candle 18 produced by the present machine is depicted in FIG. 2. The candle includes an insert 20 surrounded by a main body portion 22 and contained a wick 24 extending through the insert for its entire length. Both the insert and main body portion are formed of wax or paraffin so that as the candle burns, both the insert and main body portion melt substantially equally. The insert extends for substantially the entire length of the candle so that as the candle melts, the configuration of the insert remains. While the insert in this disclosed embodiment is a cross and the candle is circular in section, it should be understood from the outset that the shape of the insert and candle may be altered as desired and that each may have any desired configuration. The present invention is in no way limited to the specific shapes discussed and shown in the preferred embodiment.

At the upstream end of the machine, there is provided a firsts continuous conveyor 26 and a second continuous conveyor 28. At a portion of the machine 30 adjacent the upstream end, a horizontal section 32 of the second conveyor extends parallel to and spaced vertically above a horizontal section 34 of the first conveyor. The details of the first and second conveyors are depicted in FIG. 3.

As shown, the first conveyor 26 comprises a pair of parallel chains 36 (only one of which is shown) driven by sprockets 38 which in turn are driven by the main motor drive of the machine which is not shown. A plurality of spaced parallel bars 40 extend across the chains. Each of the bars includes a raised center section 42 carrying a plurality of insert mold bases 44. The mold bases 44 are formed of shim steel approximately 0.015 inches thick and are provided with inwardly directed lips 46 which engage the center bar in a snap fit, as shown.

In a somewhat similar manner, the second conveyor 28 comprises a pair of spaced parallel chains 48 suitably driven by sprocket wheels 50 which in turn are driven by the main motor drive of the machine. An end plate 52 is secured to each chain and a pair of spaced apart back-to-back L-shaped channels 54 and 56 extend across the width of the chain from end plate to end plate. A plurality of open ended insert molds 58 are provided in the space between the channels secured to the channels by bolts or similar fasteners 60 as shown. The insert molds 58 are positioned and arranged to align one-to-one with the mold bases 44 of the first conveyor. As with the mold bases 44, the insert molds 58 are also formed of shim steel of approximately 0.015 inch caliber.

Figure 3:
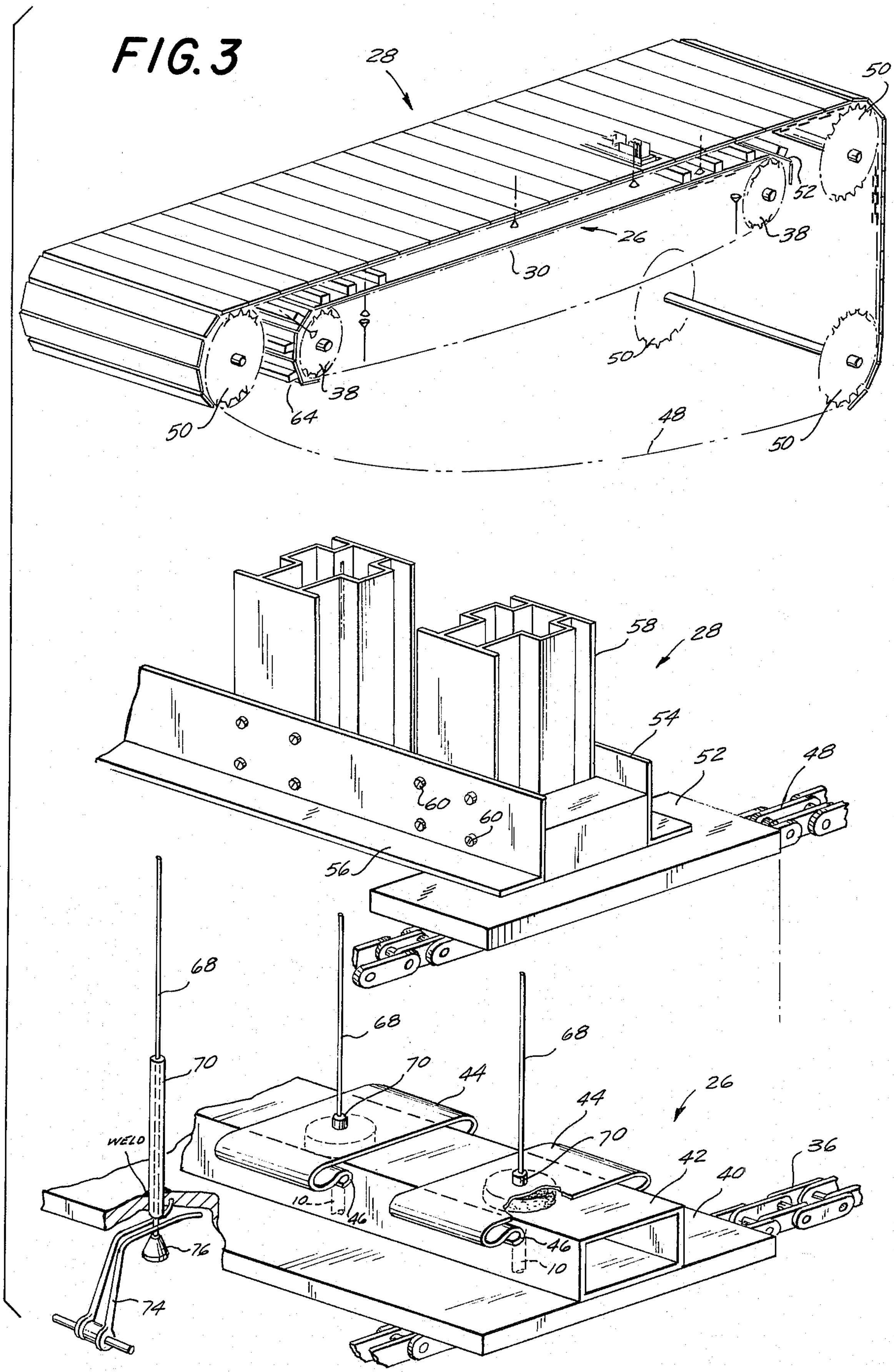
FIG. 3 is a simplified perspective view depicting the conveyor arrangement with the machine of FIG. 1.

As shown best in FIG. 3, over an extended portion 30 of the machine, the path of the second conveyor is such that a horizontal section overlies a horizontal section of the first conveyor. At the upstream end 62 of the portion 30 of the machine, the mold bases 44 are brought into registry with the insert molds 58 so that each insert mold 58 exactly overlies a mold base 44. At the downstream end 64 of the machine portion 30, the mold bases separate from the inserts.

Referring briefly to FIG. 1A, it can be seen that a first casting station 66 is provided adjacent the upstream end 62 of the machine portion 30. As the conveyor passes beneath the casting station 66, molten paraffin is introduced into the insert molds 58 through the open top of the molds. The length of machine portion 30 is designed to be sufficiently long to insure that the pariffin solidified at least partially within the molds 58 prior to separation of the mold bases from the molds. When the molds and bases are separated, the partially solidifed insert remains within the mold for further curing.

As stated previously, each mold 58 and base 44 is formed of shim steel. The relatively thin shim steel (0.015) has excellent heat conduction characteristics so that the paraffin within the mold solidifies rather quickly and thus, relatively short distances for portion 30 are required.

Referring, once again, to FIG. 3, it can be seen that a needle 68 extends through each insert base 44. The needle 68 is telescoped within a sleeve 70 fixed below the plate so that the needle may be shifted longitudinally through the sleeve.

A cam arrangement at the upstream end of the first conveyor serves to urge each needle 68 upwardly through sleeve 70 upstream of the casting station so that the paraffin flows about the needle. A fingergrip arrangement comprising a plurality of side-by-side fingergrips 74 is positioned at the downstream end of the machine portion 30 extending transversely across the conveyors. Each fingergrip 74 serves to engage a flange 76 on needle 68 so that the needle is withdrawn downwardly as the conveyor moves. The fingergrips 74 are spring biased to disengage and return to position after each needle is removed to grasp the next needle. Thus, as each needle is withdrawn from the insert mold, a bore is produced in the insert solidifying within the mold. The bore serves to receive the wick 24 of the finished candle.

At a latter station in the machine, a wick is inserted in the insert bore. In order to facilitate passing the wick 24 through bore 78, it is necessary to provide a countersink 80 at one end of the insert. To this end, countersink forming means 82 are provided on the machine portion 30 just upstream of the needle removal station 74. The countersink forming means 82 are depicted in FIGS. 4 and 5.

As with the fingergrips, a plurality of countersinking means extend across the conveyor each aligned with a candle mold. Each countersinking means 82 comprises a pair of fingers 84 pivoted at one end 86 and biased toward one another by springs 88. The lower end 90 of each finger is turned inwardly and provided with a V shaped groove 92. The fingers are pivotally connected to a yoke 94 which supports a coiled electro-magnet 96. When activated, magnet 96 attracts the fingers causing them to separate. The countersinking means further includes rod 98 which passes through yoke 94 and a collar 100 which pivots in the framework of the machine. A simple weight or hammer means 102 is aligned with the free end of rod 98. A countersink tip supporting member 104 is provided at the opposite end of rod 98.

In operation, the magneto 96 is activated to separate the fingers 84 and permit a needle to pass between the V grooves of the fingers. The magneto is then deactivated so that the fingers close under the action of springs 88 and serve to "find" the needle and bring the countersink tip 106 in alignment with the needle. The needle is then withdrawn by the fingergrips as described before. When the needle is withdrawn sufficiently to clear the countersink tip 106, the hammer 102 comes down on the end 108 of rod 98 thereby driving the countersink into the insert thereby producing a countersink aligned with the bore produced as the needle is completely withdrawn. In order to protect the inwardly turned ends 90 of fingers 84, the inner faces of fingers 84 are provided with cams 208 which follow the sides of the countersink support member 104 and thereby remove the ends 90 of fingers 84 from the path of the countersink tip as shown in FIG. 5.

Thus, when the insert reaches the downstream end 64 of the machine portion 30, it includes a bore and countersink at one end. The insert 20 is still contained within mold 58 and remains within the mold 58 until it comes to a removal station 110 which comprises a simple push rod designed to push the insert from mold 58 and deposit it onto an elevator forming a portion of third conveyor means 112. Conveyor 112 carries the insert along a path sufficiently long to permit the insert to cool and cure totally. The cured insert 20 then passes through a wicking station wherein an appropriate wick is inserted in the insert and locked in position. Details of the wicking station 114 are shown in FIGS. 6A through 6D.

At the wicking station 114, a length of wick material 116 is fed through the countersink 80 into the bore of insert 20 (part of which was removed in FIG. 6A for clarity) and then severed from the wick supply by means of a guillotine cutter arrangement 118. The wick material comprises a flammable yarn or the like such as cottom stiffened by impregnation with a suitable material. Historically, lead was used for stiffening the wick or such candles, however, in more recent times other materials such as plastic resins have come into favor as stiffening agents.

Figure 6C:
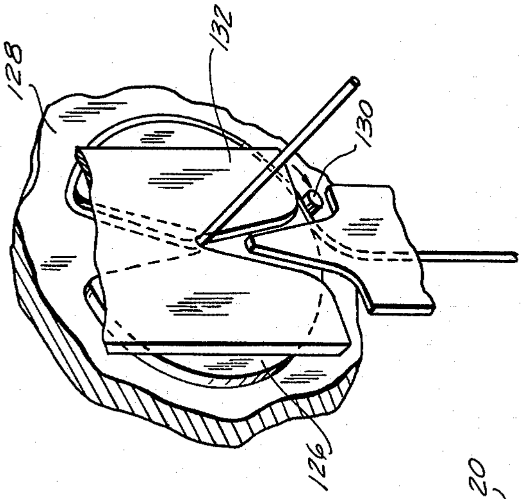
FIGS. 6A through 6D depict the wick forming mechanism of the present machine.
Figure 6B:
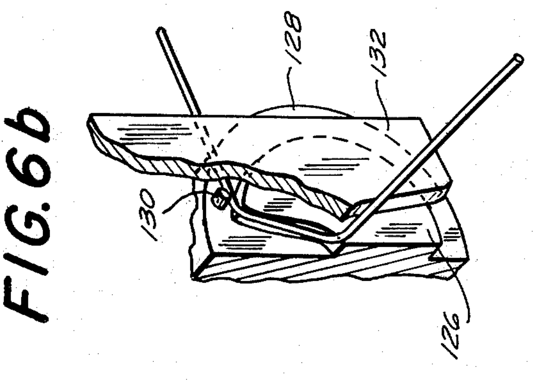
Figure 6D:
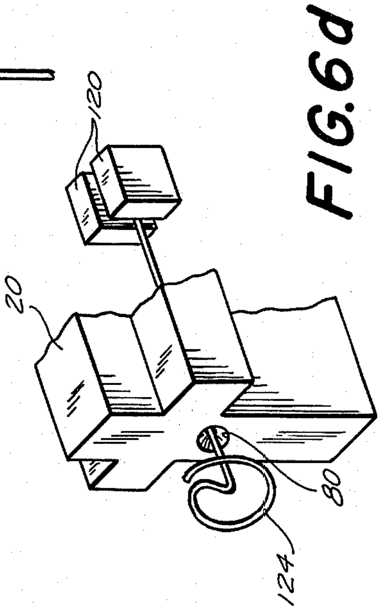
Figure 6A:
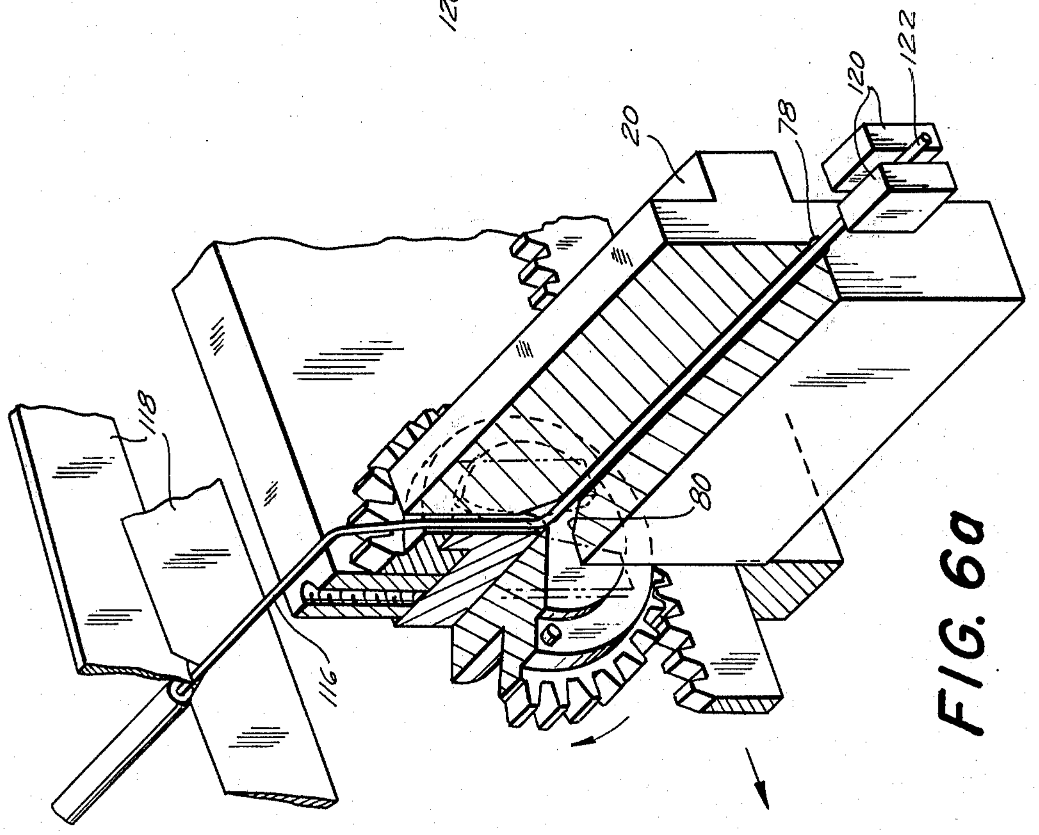

After the length of wick is passed through the insert, clamp means 120 grasps the free end 122 of the length of wick and holds it securely. As shown, guillotine 118 is positioned to cut an excess amount of wick material from the supply and the excess wick material is fashioned into a coil 124 as shown in FIG. 6D by urging the excess length of wick material about a curved die 126 by means of a rotating plate 128 carrying a pin 130. A fixed guide 132 insures that the wick forms the desired curve.

After the insert is wicked, the wicked insert 134 is deposited coil end up on a base plate 136 and the main body mold 138 is deposited about the base plate as shown in FIGS. 7 and 8. The main body plate, insert and base plate are transported to a second casting station 140 where paraffin for the main body portion of the candle is introduced about the insert to complete the final candle. The completed candle is then allowed to partially cure and then, as before, the base plate is removed and the partially cured candle is carried in the body mold 138 until it completely cures. Thereafter, the completed candle is removed from the downstream end of the machine.

As with the casting of the insert, it is not necessary that the base plate 136 remain with the main body mold 138 throughout the entire curing of the complete candle. Accordingly, the base plate and main body mold travel through the machine together to a section 142 at which point the base plate is returned along path 144 to receive a new insert while the body portion 138 remains with the candle until the candle is completely cured and then returns along path 146 to surround a new insert. The lengths of the various conveyor paths are chosen to insure the proper setting of the paraffin as required.

Thus, in accordance with the above, the aforementioned objects are effectively attained.

Having thus described the invention, what is claimed is:

1. A machine for producing decorative candles of the type having a main body portion and insert, said machine comprising:

an upstream end;

a downstream end from which the final candle may be removed;

a first conveyor;

a second conveyor;

a portion of said machine at said upstream end wherein a horizontal section of said second conveyor extends parallel to and spaced vertically above a horizontal section of said first conveyor;

at least one candle insert mold base carried by said first conveyor for movement therewith;

at least one candle insert mold carried by said second conveyor for movement therewith, said first and second conveyors being disposed so that said insert mold is deposited on said base at the upstream end of said machine portion and removed from said base at the downstream end of said machine portion;

a first casting station on said machine portion for introducing molten paraffin into said insert mold when said insert mold is positioned on said base whereby to cast an insert;

means on said machine portion for forming a bore extending longitudinally through said insert;

a removal station along the path of said second conveyor downstream of said machine portion for removing said insert from said mold and depositing said insert onto a third conveyor;

a third conveyor downstream of said second conveyor and adapted to receive inserts from said second conveyor;

means along said third conveyor for passing a wick through said insert bore;

means along said third conveyor for depositing a main body mold about said insert; and, a second casting station along said third conveyor for introducing molten paraffin about said main body mold.

2. The machine in accordance with claim 1 wherein said bore forming means comprises:

a longitudinally shiftable needle extending vertically through said insert mold base;

means disposed downstream of said casting station for shifting said needle downwardly out of said insert mold bore after said bore passes through said molding station whereby to form a bore through said insert.

3. The machine in accordance with claim 2 further comprising means for forming a countersink at one end of said bore.

4. The machine in accordance with claim 3 wherein said countersink forming means comprises:

means upstream of said needle shifting means for capturing the top end of said needle;

a countersink disposed for vertical movement aligned with said capturing means;

means for driving said countersink downwardly into said insert aligned with said needle after said needle is shifted downwardly.

5. The machine in accordance with claim 1 wherein said insert mold and insert mold base are formed of shim steel.

6. The machine in accordance with claim 1 wherein said wicking means is upstream of said second casting station.

7. The machine in accordance with claim 1 wherein said wicking means includes:

means for passing a length of wick from a source through said insert bore countersink so that a free end of the wick extends through the insert opposite said countersink and for providing an excess of wick extending from said countersink; and, means for coiling said excess wick about said countersink.

8. The machine in accordance with claim 7 wherein said wicking means further includes means for severing said length of wick from said source and means for grasping and securing said wick free end while said severing means severs said length of wick and said coiling means coils said wick excess.

* * * * *